United States Patent
Bossoney et al.

[11] Patent Number: 5,898,281
[45] Date of Patent: Apr. 27, 1999

[54] METHOD AND DEVICE FOR THE COMMON REGULATION OF SEVERAL ELECTRIC MOTORS DRIVING THE DRIVING WHEELS OF A MOTOR VEHICLE

[75] Inventors: Luc Bossoney, La Neuveville; Robert Apter, Yverdon-les-Bains, both of Switzerland

[73] Assignee: SMH Management Services AG, Switzerland

[21] Appl. No.: 08/782,291

[22] Filed: Jan. 13, 1997

[30] Foreign Application Priority Data

Jan. 29, 1996 [FR] France .................................. 96 00997

[51] Int. Cl.$^6$ .................................................. B61C 15/08
[52] U.S. Cl. ............................... 318/52; 318/71; 303/110; 303/111
[58] Field of Search ..................... 318/138, 139, 318/370–389, 52, 71; 303/96, 95, 100, 111, 116 R, 98, 99, 119, 104; 188/181 C, 181 A, 181 R

[56] References Cited

U.S. PATENT DOCUMENTS

| | | | |
|---|---|---|---|
| 4,335,337 | 6/1982 | Okamatsu et al. | 318/52 |
| 4,893,880 | 1/1990 | Arikawa | 303/110 |
| 4,979,784 | 12/1990 | Arikawa | 303/111 |
| 5,011,235 | 4/1991 | Arikawa | 303/96 |
| 5,100,209 | 3/1992 | Arikawa | 303/96 |

FOREIGN PATENT DOCUMENTS

| | | |
|---|---|---|
| 0 576 947 | 1/1994 | European Pat. Off. . |
| 0 594 130 | 4/1994 | European Pat. Off. . |

*Primary Examiner*—Paul Ip
*Attorney, Agent, or Firm*—Griffin, Butler, Whisenhunt & Szipl, LLP

[57] ABSTRACT

In a motor vehicle driving system comprising several asynchronous electric machines (11, 12) each coupled to a driving wheel (13, 14), a polyphase supply device (2) and a regulating device (6) using a reference signal (SR) representative of a speed of one of the driving wheels, the invention provides a method and a device allowing an optimum electric supply to be assured when one or more of the driving wheels skid in drive mode or locks in the event of braking. For each driving wheel, a measured speed signal (NM1, NM2) is processed in a detection unit (23, 24) which detects skidding or locking and delivers binary skid (P1, P2) and locking (B1, B2) signals and a corrected speed signal (NC1, NC2) representing, as required, the speed prior to skidding or locking. A selection unit (25) selects one of the corrected speed signals as reference signal. Applications to electric or hybrid-powered vehicles.

18 Claims, 2 Drawing Sheets

METHOD AND DEVICE FOR THE COMMON REGULATION OF SEVERAL ELECTRIC MOTORS DRIVING THE DRIVING WHEELS OF A MOTOR VEHICLE

BACKGROUND AND SUMMARY OF THE INVENTION

The present invention concerns a method for regulating the common electric supply of several electric machines each capable of driving a driving wheel of a motor vehicle, wherein a polyphase AC supply current, whose voltage and/or frequency are regulated as a function of at least one set-value signal and of a reference signal, is produced to supply said electric machines together, a set of speed signals each representing the speed of rotation of a respective driving wheel is continually produced and one of the speed signals is selected from said set to deliver the reference signal.

The invention also concerns a driving system for an electrically powered motor vehicle, in particular for implementing the aforementioned method, said system comprising several electric machines each coupled to a driving wheel of the vehicle, a supply device producing a polyphase AC supply current to supply said electric machines together, and a regulating device for controlling the supply device as a function of a set-value drive signal and the rotation speeds of the driving wheels, the regulating device comprising means for continually producing a set of speed signals representing respectively the speeds of each driving wheel, processing means arranged for delivering a reference signal as a function of the speed signals, and a control unit arranged for receiving the set-value traction signal and the reference signal and consequently for controlling the supply device.

Patent application EP-A-0 576 947 discloses such a driving system for a two or four wheel drive electric motor vehicle. This system is illustrated schematically by FIG. 1 annexed hereto for the case of a two wheel drive vehicle. Each driving wheel is coupled to its own polyphase asynchronous motor M1, M2, all of these motors being connected to a central electric supply 2 which produces a polyphase current IAL having a voltage UAL and a frequency FAL, which are variable by pulse width modulation (PWM) under the control of an electronic regulating device. This device receives as inputs, on the one hand, set-value traction signals SPP and set-value braking signals SFN, produced for example by the driver with the aid of a control pedal, and on the other hand, a signal SMI representative of the polyphase supply current and a set of frequency signals MFR1, MFR2 each of which comes from a respective sensor 10 and represents the instantaneous speed of corresponding motor M1, M2 and of the wheel associated therewith. The device processes the input signals to deliver to central supply 2 two control signals SCF and SCA which define respectively the frequency and the amplitude, and thus the effective voltage of the common supply of the motors.

Given that the wheels may rotate at different speeds, in particular when the vehicle turns a corner, one of said frequency signals (i.e. one of the speed signal) MFR1, MFR2 is selected by a processing unit 4 as reference signal SFMX to be used for regulating by a control unit 6, whereas the other signal or signals of the set of signals remain unused. According to the aforecited document, the highest frequency signal will always be selected, so that regulation of all the motors is effected in real time by considering only the fastest rotating motor and wheel.

This known method is advantageous both in drive mode and in electric braking mode, in association with asynchronous motors, because these latter only produce torque if there exists a difference in rotation speed between the rotor and the stator rotating field, such difference being called slip. In drive mode, the fastest rotating motor has the lowest slip and thus provides the lowest engine torque. The corresponding wheel thus has less tendency to skid than the others and, if it does skid anyway because of insufficient grip, the slip of its motor and thus also of the torque decreases, which encourages the wheel to regain grip. Consequently, in most cases of skidding in drive mode, the speed of the wheel which is skidding does not increase much, so that the regulating device does not increase the supply frequency much and the engine torque subsists on the other driving wheel or wheels.

It may however happen that one driving wheel (or several) skid long enough for the regulating device to "race" by repeatedly increasing the common supply frequency in drive mode. In particular if one driving wheel skids on a very slippery surface such as ice, it continues to be driven almost at the speed of the rotating field, with a low torque and low motor slip. Since the regulating device defines the set-value frequency by adding a substantial slip frequency to the reference signal frequency provided by the fastest rotating wheel, it then tends to increase the supply frequency, and thus the speed of the skidding wheel, thus once again the supply frequency and so on. In the other motors, the slip becomes so great that the torque ends up decreasing on the wheel or wheels which are not skidding, so that proper traction is no longer possible. This annoying situation cannot end without external action, for example a change in the set-value signal because the driver significantly releases the accelerator, or without the use of a generally complex and expensive anti-skid device, such as is known for conventional motor vehicles.

In braking mode, the principle of selecting the signal representing the fastest rotating wheel is advantageous in the event that a wheel having insufficient grip is locked. By the term "locked", one means here that the rotation of the wheel is stopped, for example by mechanical braking, or excessively slowed down by electric braking, so that it skids on the ground because its rotation speed rapidly falls to a much lower value than that which would result from the running speed of the vehicle. With the aforementioned principle of selection, the speed signal of a locked wheel will not be selected. However, the device disclosed in the aforecited document cannot operate properly if all the driving wheels are locked, because it then continues to brake the wheels electrically by maintaining negative slip in the motors.

An object of the present invention is to improve such a method and such a device so as to prevent automatically one or more driving wheels racing in the event of skidding in drive mode, by using relatively simple, reliable and inexpensive technical means. According to an additional object of the invention, the method and the device should allow operation according to a similar principle in electric braking mode.

For this purpose, the invention provides a method of the type indicated hereinbefore, characterised in that, in a drive mode where said machines drive the driving wheels, skid detection is continually being effected for each driving wheel and, in the selection step, if at least one driving wheel is skidding and at least one driving wheel is not skidding, the speed signal corresponding to the fastest rotating non-skidding driving wheel is selected or, if all the driving wheels are skidding, a first substitution signal is used in order to deliver the reference signal.

Thus, in the event that, for example a single wheel is skidding in drive mode, the corresponding speed signal is simply left to one side and the selection is made from the other speed signal or signals according to the method of the prior art, with the same advantages and without risk of racing. If all the wheels are skidding, regulating may be continued rationally with the aid of a substitution signal which represents, for example, the rotation speed of a driving wheel immediately prior to skidding.

According to an advantageous development of the method, in a braking mode where said machines are driven by the driving wheels, locking detection is continually effected for each driving wheel and, in the selection step, if at least one driving wheel is not locked, the speed signal corresponding to the fastest rotating driving wheel is selected or, if all the driving wheels are locked, a second substitution signal is used to deliver the reference signal.

As a result, similar selection rules are applied in drive mode and in braking mode, since the case where all the driving wheels are locked is resolved in a similar manner to the case in which all the driving wheels are skidding. The second substitution signal preferably represents the rotation speed of a driving wheel immediately prior to locking, so that it can be determined in the same manner as the first substitution signal.

A driving system according to the invention is characterised in that the processing means comprise selecting means and, for each speed signal, a skid detection unit arranged for detecting skidding via detection of an abrupt rise in the speed signal and for delivering to the selecting means a corrected speed signal and a skid signal, the selecting means being arranged for selecting one of the corrected speed signals as the reference signal as a function of the skid signals.

Each skid detection unit is preferably also arranged for detecting locking of the corresponding wheel via detection of an abrupt decrease in the speed signal and for delivering to the selecting means a locking signal, the selecting means being arranged for selecting one of the corrected speed signals as the reference signal as a function of the skid signals and the locking signals.

BRIEF DESCRIPTION OF THE DRAWINGS

Other features and advantages of the invention will appear in the description of a preferred embodiment of the invention, presented hereinbelow by way of example with reference to the annexed drawings, in which.

DETAILED DESCRIPTION OF THE INVENTION

Figure 1:
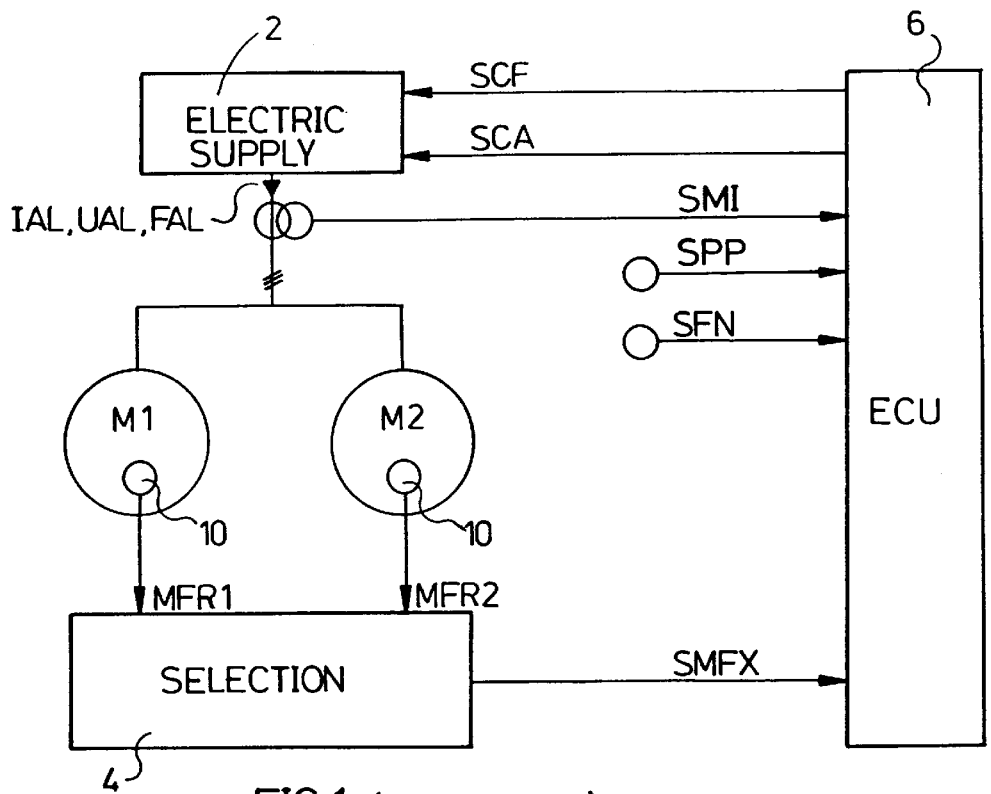
FIG. 1 shows schematically a driving system according to the prior art described hereinabove.
Figure 2:
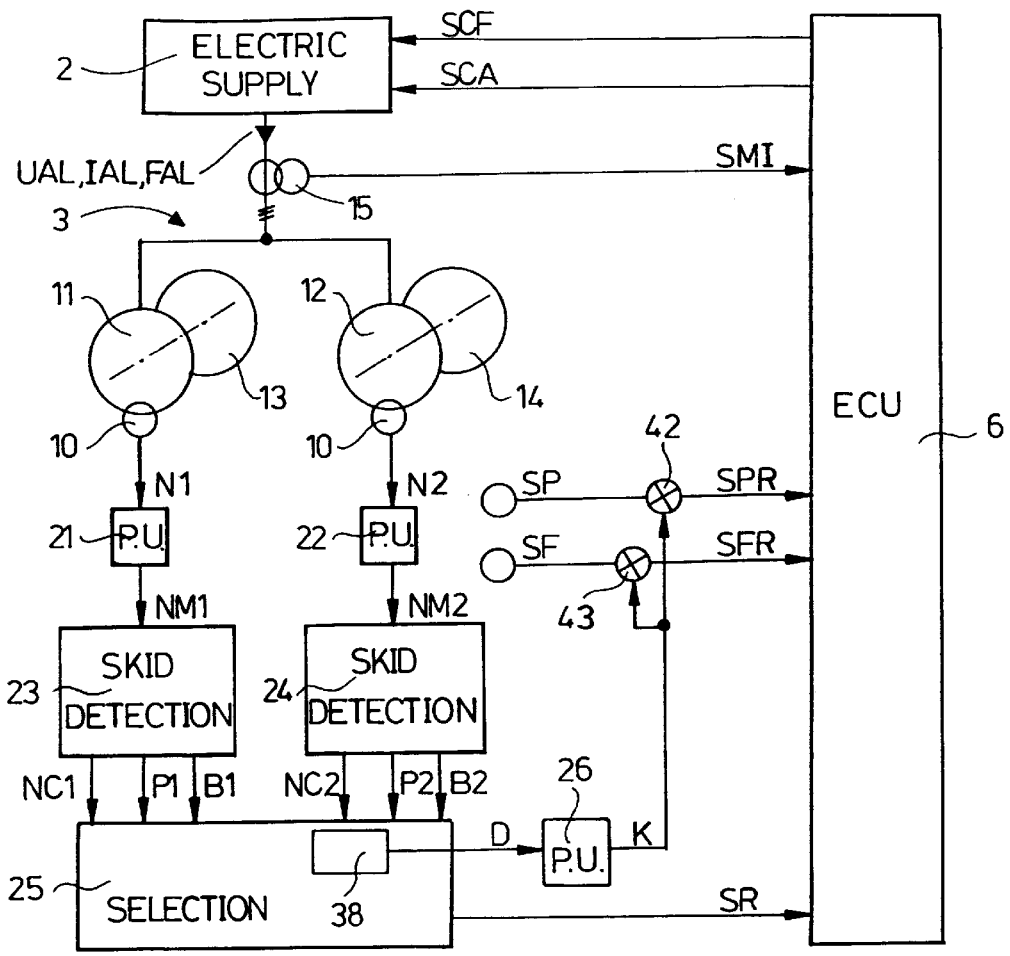
FIG. 2 shows schematically a driving system according to an embodiment of the present invention.

According to FIG. 2, as for the case of FIG. 1, an electric supply device 2 produces, on a supply circuit 3, a polyphase AC supply current having a voltage UAL, an amperage IAL and a frequency FAL, for supplying two asynchronous electric machines 11, 12, coupled respectively to two driving wheels 13, 14 of the vehicle. Supply device 2 may be of any suitable type, for example in the form of an accumulator battery associated with an electronic inverter comprising a power switching device and a pulse width modulator, or a generator set comprising a thermal engine, an electric generator and, if required, an electronic inverter. The invention thus applies both to a hybrid-powered vehicle and to a purely electric vehicle.

Supply device 2 is controlled by a regulating device 6 which delivers thereto a set-value frequency signal SCF and a set-value amplitude signal SCA. Device 6 elaborates its signals, for example in the manner described in patent document EP-A-0 576 947, from signals SMI, SP, SF and SR which it receives. Signal SMI is a principal electric supply current measurement signal produced by device 2. This signal is provided by a current sensor 15. Signals SP and SF are set-value signals, respectively set-value drive and braking signals, originating from control elements actuated by the driver of the vehicle. Signal SR is a reference signal intended to represent a speed of driving wheels 13, 14 and of their motors 11, 12. Elaboration of this reference signal constitutes an essential point of the invention described here.

A speed sensor 10 is associated respectively with each motor 11, 12 (or with each corresponding driving wheel 13, 14), and delivers a measurement signal N1, N2 to a processing unit 21, 22 which processes and normalizes this measurement signal in order to deliver a speed signal NM1, NM2 which, in this example, is in analogue form, but an embodiment in digital form is also possible. This speed signal is delivered to the input of a skid detection unit 23, 24 which will be described in detail hereinafter. Each unit 23, 24 delivers to a common selection unit 25 a corrected speed signal NC1, NC2, a skid signal P1, P2 and a locking signal B1, B2. Selection unit 25 processes these signals and consequently delivers reference signal SR to regulating device 6. If required, it also delivers a signal D to a processing unit 26 which will be described hereinafter.

Of course, the driving system may comprise more than two motors 11, 12, for example four motors coupled to four driving wheels. It will then include a corresponding number of skid detection devices 23, 24 which will deliver their respective signals to selection unit 25. The following description also applies to such a case.

Figure 3:
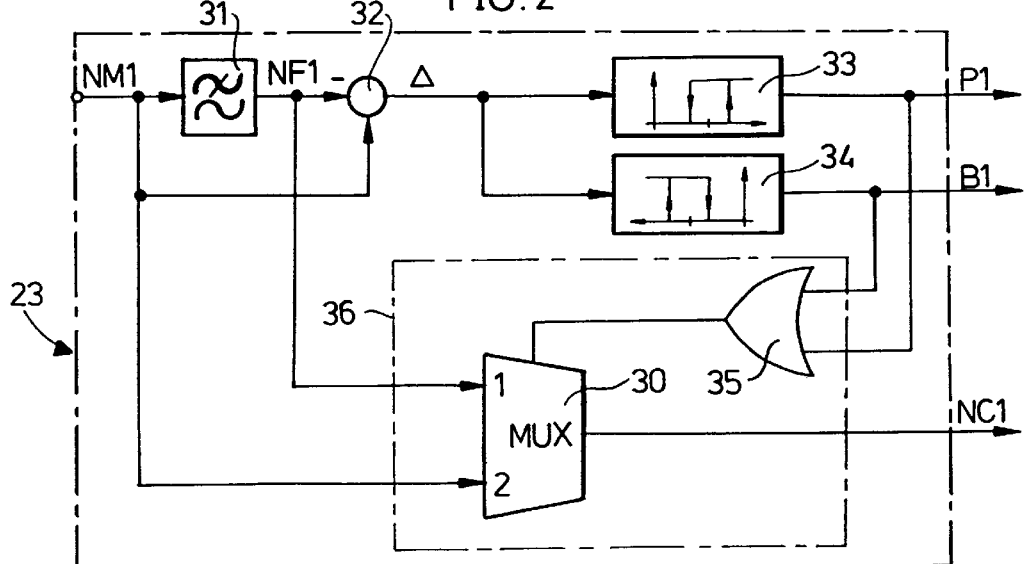
FIG. 3 is a functional diagram of an element of FIG. 2.

FIG. 3 is a functional diagram of skid detection unit 23 which processes speed signal NM1. The same diagram applies to unit 24 if the FIG. 1 is replaced by 2 in the signal names.

In unit 23, speed signal NM1 is transmitted both to a first input of a multiplexer 30 and to an input circuit formed by a low-pass filter 31 which delivers a filtered signal NF1 to a second input of multiplexer 30. A differentiating circuit 32 also receives signals NM1 and NF1 and calculates their algebraic difference Δ, the representative signal thereof being transmitted to two hysteresis comparators 33 and 34 respectively delivering a skid signal P1 and a locking signal B1. Signals P1 and B1 are transmitted to the two inputs of an OR gate 35 which controls multiplexer 30 and forms therewith an output circuit 36.

Signals P1 and B1 are binary signals. First comparator 33 gives P1 the value 1 when a positive value of Δ has exceeded a predetermined positive threshold, and the value 0 when the value of Δ has lowered again. Second comparator 34 gives B1 the value 1 when a negative value of Δ exceeds in a negative direction a negative threshold, and the value 0 when the value of Δ has increased again.

When speed signal NM1 is constant or has a relatively slow variation, corresponding to normal acceleration or deceleration of the vehicle, this variation may reverberate through low-pass filter 31 in signal NF1, so that the value of Δ will be zero or low and that both signals P1 and B1 will have the value 0. In such case, the output signal of OR gate 35 also has the value 0 and instructs the first input of multiplexer 30 to pass to the output thereof, so that corrected speed signal NC1 is equal to NM1.

Conversely, if driving wheel 13 begins to skid in drive mode, its speed signal NM1 abruptly rise, but its filtered value NF1 corresponds to the pre-skidding speed. Difference Δ then exceeds the threshold determined by comparator 33, signal P1 then takes the value 1 indicating that there is skidding, whereas B1 remains at 0. The output signal of OR gate 35 takes the value 1 and causes the second input of multiplexer 30 to transmit to the output thereof. Corrected speed signal NC1 then has filtered value NF1 indicating the pre-skidding speed of the wheel.

In a similar manner, if driving wheel 13 locks during braking, the abrupt fall in its speed signal NM1 does not reverberate through filter 31 and filtered signal NF1 then represents the pre-locking speed of the wheel. Difference Δ has a strongly negative value, which exceeds in a negative direction the threshold fixed in comparator 34 and gives locking signal B1 the value 1, whereas P1 remains at 0. As in the preceding case, the output of OR gate 35 has the value 1, so that corrected speed signal NC1 is equal to NF1 and represents the pre-locking speed of the wheel.

Thus, selection unit 25 receives three signals NC, P and B for each driving wheel. It is preferably arranged for selecting one of signals NC according to the following rules in order to deliver the latter as reference signal SR:

If all the driving wheels are skidding, all of skid signals P have the value 1. All of corrected speed signals NC represent the pre-skidding speeds, indicated by filtered signals NF. Unit 25 then selects signal NC having the minimum value, i.e. reference signal SR is formed by a first substitution signal representing the speed of the wheel which was rotating most slowly prior to skidding.

If all the wheels are locked, all of signals B have the value 1. All of corrected speed signals NC represent the pre-locking speeds, indicated by filtered signals NF. Selection unit 25 then selects signal NC having the maximum value, i.e. reference signal SR is formed by a second substitution signal representing the speed of the wheel which was rotating the fastest prior to being locked.

In all other cases, selection unit 25 selects signal NC having the maximum value. This is the case not only when all the driving wheels grip the ground normally, so that all of signals NC are equal to respective speed signals NM, but also when at least one driving wheel grips whilst the others skid or are locked. The supply of the motor of the wheel or of each wheel which grips may then continue normally. This rule of selection also applies to the theoretical case where certain driving wheels skid and all the others are locked.

Figure 4:
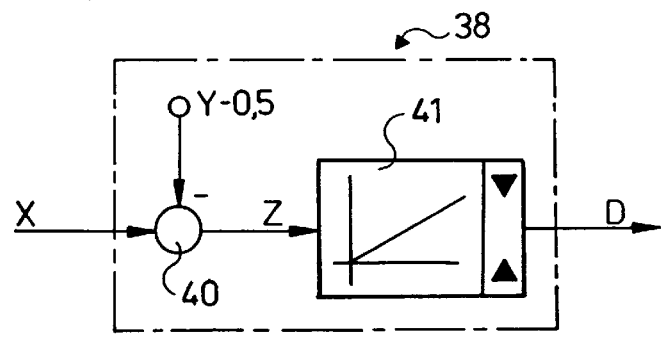
FIG. 4 is a functional diagram of another element of FIG. 2.
Figure 5:
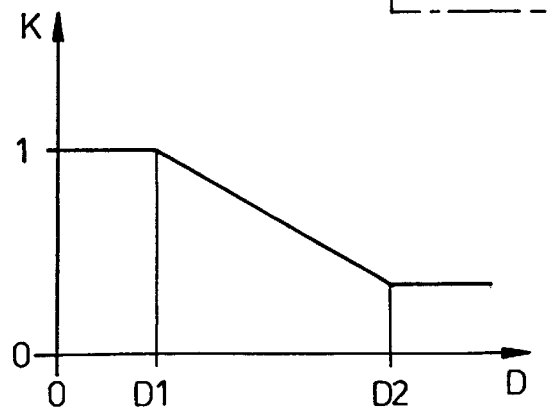
FIG. 5 is a diagram showing a function applied by another element of FIG. 2.

Signal D produced by selection unit 25 is intended to limit the traction or braking torque produced by electric machines 11, 12 operating respectively as motor or as generator, when all the driving wheels skid or are locked, by means of a limitation of set-value drive and braking signals SP and SF. Such a situation is indicated by the fact that, for each driving wheel, skid signal P or locking signal B has the value 1. In this situation, an integrator block 38 incorporated into selection unit 25 delivers signal D representing the skid or locking duration of all the driving wheels. FIG. 4 shows a functional diagram of block 38, where X represents the number of driving wheels which are skidding or are locked, and Y is the total number of driving wheels, for example two in the diagram of FIG. 2. A differentiator 40 delivers a signal Z equal to the positive difference between X and (Y−0.5). An integrator circuit 1, formed for example by a clock pulse counter, integrates signal Z as a function of time and delivers at its output signal D limited downwards to zero and upwards to a predetermined value. As is shown by FIG. 1, signal D is transmitted to processing unit 26 which applies thereto the function represented in FIG. 5 in order to deliver signal K. The latter has the value 1 while skidding or locking duration D is less than a first limit D1, then it is gradually reduced as a function of time to a second limit duration D2, after which K keeps a constant reduced value. Limits D1 and D2 will be selected as a function of a desired dynamic performance of the vehicle. Signal K acts as factor in multiplier circuits 42 and 43 to reduce respective set-value signals SP and SF to reduced values SPR and SFR when the driving wheels skid or are locked for a duration greater than D1. The effect of this reduction is to limit the supply of electric machines 11 and 12 by supply device 2, and thus to reduce their torque and encourage the wheels to regain grip.

In an alternative embodiment which is not shown of the device described hereinbefore, set-value signals SP and SF may be acted upon separately, according to whether it concerns skidding or locking of the driving wheels. A first unit 38 and a first unit 26 are then provided for producing a conversion factor K acting on first multiplier circuit 42 to limit traction in the event of skidding, and a second unit 38 and a second unit 26 for producing a second reduction factor K acting on second multiplier circuit 43 in the event of locking of the wheels. This allows different values to be adopted for parameters D1, D2 and K in the two situations.

The preceding description shows that, while maintaining the advantages of the prior art, the present invention allows adequate control of the electric machines operating as motor or as generator to be assured in all cases where skidding or locking of one or more of the driving wheels occurs, and this in a manner which encourages such wheels to regain grip. Moreover, these advantages may be obtained without requiring any modification of regulating device 6 of the prior art. However, such device may also be modified without departing from the scope of the present invention.

What is claimed is:

1. A method for regulating the common electric supply of several electric machines each capable of driving a respective driving wheel of a motor vehicle in a drive mode, wherein a polyphase AC supply current, whose voltage and/or frequency are regulated as a function of at least one set-value signal and one reference signal, is produced for supplying said electric machines together, a set of speed signals, each representing the speed of rotation of a respective one of said driving wheels is continually produced, said method comprising the step of selecting either one of said speed signals from said set or a substitution signal in order to deliver said reference signal, wherein, in said drive mode, skid detection is continually being effected for each driving wheel and, in said selection step, if at least one driving wheel is skidding and at least one driving wheel is not skidding in said drive mode, the speed signal corresponding to the fastest rotating non-skidding driving wheel is selected or, if all the driving wheels are skidding in said drive mode, a first substitution signal is produced and used in order to deliver said reference signal.

2. A method according to claim 1, wherein said first substitution signal represents the speed of a driving wheel measured immediately before it skids.

3. A method according to claim 1, wherein, in a braking mode in which said machines are driven by the driving wheels, locking detection is continually effected for each driving wheel and, in said selection step, if at least one driving wheel is not locked, the speed signal corresponding to the fastest rotating driving wheel is selected or, if all the driving wheels are locked, a second substitution signal is produced and used in order to deliver said reference signal.

4. A method according to claim 3, wherein said second substitution signal represents the speed of a driving wheel measured immediately before it locks.

5. A driving system for an electrically powered motor vehicle, said system comprising several electric machines each coupled to a respective driving wheel of the vehicle, a supply device producing a polyphase AC supply current to supply said electric machines together, and a regulating device for controlling said supply device as a function of a set-value drive signal and the rotation speeds of said driving wheels, the regulating device comprising means for continually producing a set of speed signals representing respectively the speeds of each driving wheel, processing means arranged for delivering a reference signal as a function of said speed signals, and a control unit arranged for receiving said set-value drive signal and said reference signal and consequently for controlling said supply device, wherein said processing means comprise selection means and, for each speed signal, a respective skid detection unit arranged for detecting skidding via detection of an abrupt rise in the speed signal and for delivering to said selection means a corrected speed signal and a skid signal, and wherein said selection means are arranged for selecting one of said corrected speed signals as reference signal as a function of said skid signals.

6. A driving system according to claim 5, wherein each skid detection unit is further arranged for detecting locking of the corresponding wheel via detection of an abrupt decrease in the speed signal and for delivering to the selection means a locking signal, the selection means being arranged for selecting one of the corrected speed signals as reference signal as a function of the skid signals and the locking signals.

7. A driving system according to claim 5, wherein each skid detection unit comprises:

an input circuit receiving the speed signal and producing at each moment a substitution signal which represents a former state of the speed signal, a differentiating circuit producing a differential signal which represents the difference between the substitution signal and the speed signal, a comparison circuit which compares the differential signal to a threshold and delivers the skid signal in binary form, indicating skidding if said threshold is exceeded, and an output circuit which receives said speed, substitution and skid signals and delivers as corrected speed signal the speed signal or the substitution signal, as a function of the state of the skid signal.

8. A driving system according to claim 7, wherein each speed signal is an analogue signal and wherein said input circuit is a low-pass filter.

9. A driving system according to claim 6, wherein each skid detection unit comprises:

an input circuit receiving the speed signal and producing at each moment a substitution signal which represents a former state of the speed signal, a differentiating circuit producing a differential signal which represents the difference between the substitution signal and the speed signal, a comparison circuit which compares the differential signal to a threshold and delivers the skid signal in binary form, indicating skidding if said threshold is exceeded, an output circuit which receives said speed, substitution and skid signals and delivers as corrected speed signal the speed signal or the substitution signal, as a function of the state of the skid signal, and another comparison circuit, which compares the differential signal to a negative threshold and delivers the locking signal in binary form, indicating locking if said negative threshold is exceeded in a negative direction, said output circuit further receiving the locking signal and delivering as corrected speed signal the speed signal or the substitution signal, as a function of the state of the skid and locking signals.

10. A driving system according to claim 9, wherein each speed signal is an analogue signal and wherein said input circuit is a low-pass filter.

11. A driving system according to claim 5, wherein the processing means comprise means for measuring a period of time during which the skid signals indicate that all the driving wheels are skidding and for modifying the set-value drive signal when said period of time exceeds a predetermined value.

12. A driving system according to claim 11, wherein each skid detection unit is further arranged for detecting locking of the corresponding wheel via detection of an abrupt decrease in the speed signal and for delivering to the selection means a locking signal, the selection means being arranged for selecting one of the corrected speed signals as reference signal as a function of the skid signals and the locking signals, and wherein the processing means comprise means for measuring a period of time during which the locking signals indicate that all the driving wheels are locked and for modifying a set-value braking signal when said period of time exceeds a predetermined value.

13. A method for regulating the common electric supply of several electric machines each capable of driving a respective driving wheel of a motor vehicle in a drive mode and of braking said driving wheel in an electric braking mode, wherein a polyphase AC supply current, whose voltage and/or frequency are regulated as a function of at least one set-value signal and one reference signal, is produced for supplying said electric machines together, a set of speed signals, each representing the speed of rotation of a respective one of said driving wheels, is continually produced, said method comprising the step of selecting either one of said speed signals from said set or a substitution signal in order to deliver said reference signal, wherein, in said drive mode, skid detection is continually being effected for each driving wheel and, in said selection step, if at least one driving wheel is skidding and at least one driving wheel is not skidding in said drive mode, the speed signal corresponding to the fastest rotating non-skidding driving wheel is selected or, if all the driving wheels are skidding in said drive mode, a first substitution signal is produced and used in order to deliver said reference signal.

14. A method according to claim 13, wherein said first substitution signal represents the speed of a driving wheel measured immediately before it skids.

15. A method according to claim 13, wherein, in said electric braking mode, locking detection is continually effected for each driving wheel and, in said selection step, if at least one driving wheel is not locked, the speed signal corresponding to the fastest rotating driving wheel is selected or, if all the driving wheels are locked, a second substitution signal is produced and used in order to deliver said reference signal.

16. A method according to claim 15, wherein said second substitution signal represents the speed of a driving wheel measured immediately before it locks.

17. A method for regulating the common electric supply of several electric machines each capable of driving a respective driving wheel of a motor vehicle in a drive mode, wherein a polyphase AC supply current, whose voltage and/or frequency are regulated as a function of at least one set-value signal and one reference signal, is produced for supplying said electric machines together, a set of speed signals, each representing the speed of rotation of a respective one of said driving wheels, is continually produced, said method comprising the step of selecting one of said speed signals from said set in order to deliver said reference signal, wherein skid detection is continually being effected for each driving wheel and wherein in said selection step, when a driving wheel is skidding while it is driven by the corresponding electric machine, the speed signal corresponding to said driving wheel is substituted in said set of speed signals with a corrected speed signal representing a speed of said wheel prior to skidding.

18. A method according to claim 17, wherein locking detection is continually effected for each driving wheel and wherein in said selection step, when a driving wheel is locked, the speed signal corresponding to said driving wheel is substituted in said set of speed signals with a corrected speed signal representing a speed of said wheel prior to locking.

* * * * *